Sept. 15, 1953  C. E. IDDINGS  2,652,026
DAIRY FEEDER
Filed Feb. 23, 1952
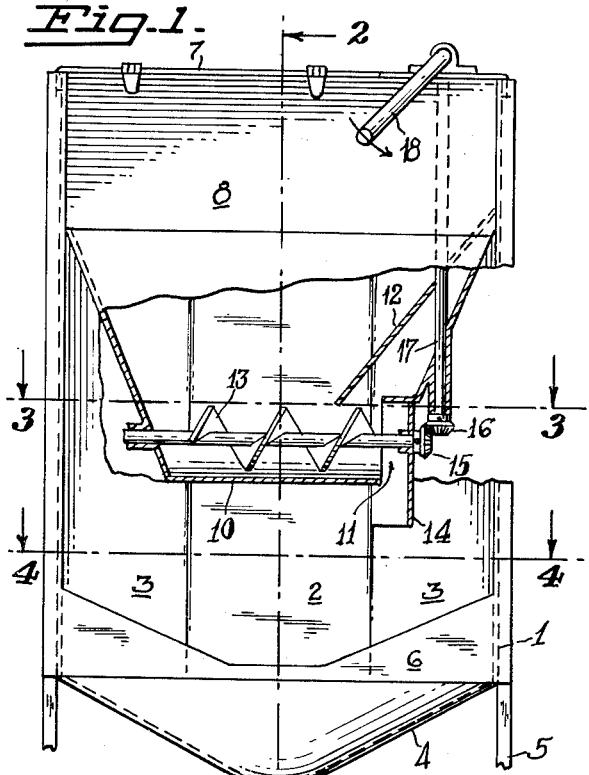
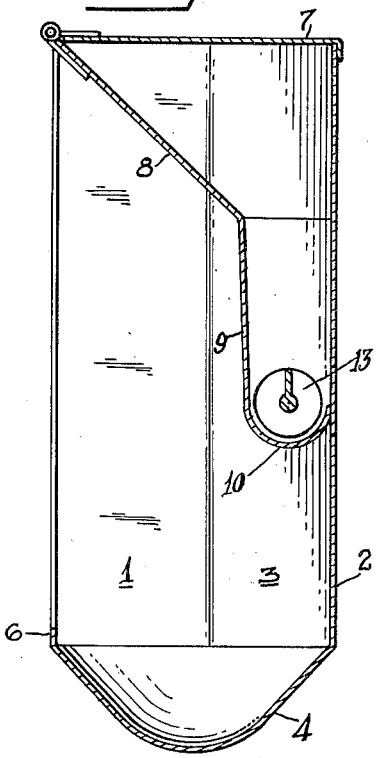
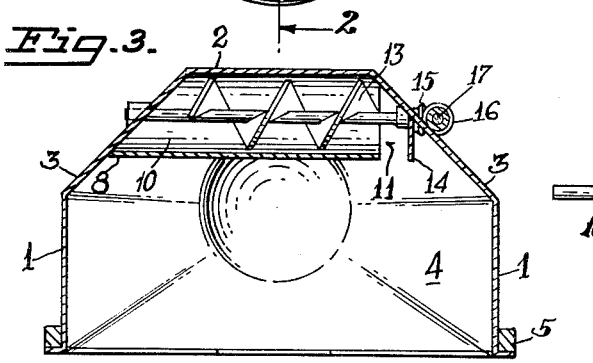
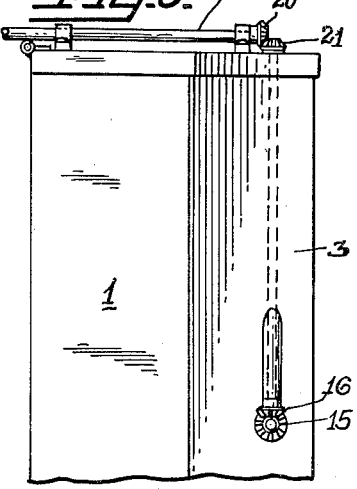
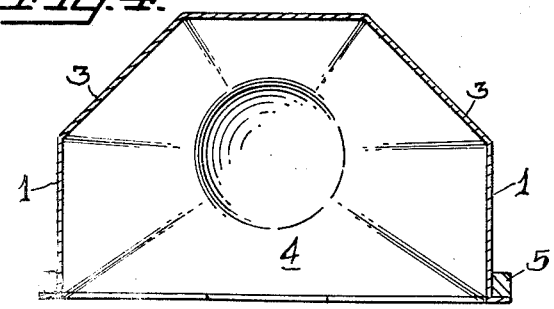
INVENTOR.
CHARLES E. IDDINGS
BY
J. E. Trabucco
ATTORNEY Patented Sept. 15, 1953

2,652,026

UNITED STATES PATENT OFFICE 2,652,026

DAIRY FEEDER

Charles E. Iddings, Petaluma, Calif.

Application February 23, 1952, Serial No. 273,044

1 Claim. (Cl. 119—56)

This invention relates to an improved dairy feeder of the type having means for dispensing measured quantities of dairy feed into a feeding trough.

The present invention provides an improved dairy feeder having in combination with an elevated storage bin for holding a supply of dairy feed, a manually controlled rotatable screw conveyor arranged in operative relation with the outlet of the bin, whereby measured quantities of the dairy feed may be discharged into a feeding trough beneath.

The primary object of my invention is to provide an improved dairy feeder of the type characterized, embodying a novel combination by which measured quantities of dairy feed may be conveniently conveyed by the manual rotation of a screw conveyor from a supply bin to a discharge opening where it may fall into a feeding trough beneath.

Another object of my invention is to provide an improved dairy feeder which functions in a manner permitting the supplying of predetermined quantities of dairy feed to a feeding trough by merely turning a control handle, thereby saving both time and labor over the feeding methods now commonly used in dairies.

Other and further advantages and objects of my invention will be pointed out hereinafter or will be indicated in the appended claim, or will be obvious to one skilled in the art upon an understanding of the present disclosure. For the purposes of this application I have elected to show herein certain forms and details of a dairy feeder which is representative of my invention; it is to be understood, however, that the embodiment of my invention herein shown and described is for the purpose of illustration only and that therefore it is not to be regarded as exhaustive of the variations of the invention.

In the accompanying drawings,

Fig. 1 is a front view of a dairy feeder embodying my invention, showing parts broken away and in cross-section;

Fig. 2 is a vertical sectional view taken on the line 2—2 of Fig. 1;

Fig. 3 is a horizontal sectional view taken on the line 3—3 of Fig. 1;

Fig. 4 is a horizontal sectional view taken on the line 4—4 of Fig. 1; and

Fig. 5 is a side view of a fragmentary part of the dairy feeder, showing the operating means associated with the screw conveyor.

Shown on the drawings is an open front enclosure having opposed vertical side walls 1, 1, a vertical rear wall 2, and obliquely disposed vertical side walls 3, 3 positioned between and connected to the said side walls and the rear wall. Connected to the aforesaid vertical walls is a depending concave feed trough 4 which is adapted to hold a quantity of feed for a dairy cow having access thereto through the front opening in the enclosure. The enclosure may be suitably supported in a desirable position as by posts 5. A front vertical panel 6 arranged beneath the opening in the front of the enclosure is connected to the front side of the feed trough 4 and the sides 1, 1, the said front panel having its upper edge formed somewhat in the shape of a U so as to provide ample space permitting a dairy cow to insert its head into the enclosure and reach the feed in the trough.

Provided in the upper area of the enclosure is a feed storage bin having a top opening which is normally closed by a hinged cover 7. The bin is enclosed at its rear and lateral sides by the rear and side walls 2 and 3, 3, of the enclosure, at its front side by a front wall 8 having a lower substantially vertical portion 9. The bottom of the bin is enclosed by a substantially semicircular or curved bottom wall 10 which constitutes a lower extension of the lower front wall portion 9, the said curved bottom wall 10 being arranged in abutting relation with the vertical rear wall 2 of the enclosure. In one end of the bottom wall 10 adjacent a side 3 of the enclosure there is provided an outlet opening 11 which permits the discharge of the dairy feed from the bin into the feed trough beneath. A baffle 12 extending obliquely over the discharge opening 11 in the bin is arranged to direct the feed onto a rotatable screw conveyor 13 and at the same time prevent the feed from passing directly through the discharge opening without being conveyed to the said discharge opening by the conveyor. A vertical plate 14 secured to a side wall 3 of the enclosure is arranged to provide a bearing support for one end of the screw conveyor axis, the other end of the said axis being supported in a bearing supported by the opposite side wall 3. The screw conveyor 13 is positioned horizontally inside the curved bottom wall 10 of the feed storage bin in suitably spaced relation thereto. One end of the conveyor is secured to a bevel gear 15 which is in mesh with a similar gear 16 secured to a substantially vertical shaft 17, the said shaft extending upwardly to the top side of the bin. A crank 18 conveniently positioned in front of the upper portion of the enclosure is connected by a horizontal shaft 19 and suitable bevel gears 20 and 21 to the vertical shaft 17.

The front wall 8 of the bin is suitably shaped to direct the dairy feed onto the screw conveyor 13 as the feed is discharged through the outlet opening 11 into the feed trough beneath.

Upon manually turning the crank 18 in a suitable direction the screw conveyor 13 is rotated, thereby conveying the dairy feed to the discharge opening 11 so it may proceed therethrough and fall into the feed trough beneath. By turning the crank, say one revolution, a predetermined measured quantity of feed may be delivered to the feeding trough. Thus without measuring the quantity of feed by means such as a certain size container or by other tedious and time consuming methods, a dairyman may be certain of supplying a predetermined quantity of feed to the feed trough by merely turning the crank 18 to a required extent.

What I claim is:

A dairy feeder comprising an enclosure having lateral and rear sides and a front opening adapted to permit access to the interior of the enclosure by a dairy cow when feeding, an open feed trough positioned in the lower area of the enclosure within reach of the dairy cow, a feed supply bin supported in the upper area of the enclosure within the lateral and rear sides of the said enclosure and rearwardly of the front opening, the said bin having a semi-circular bottom side positioned above the feed trough and downwardly converging side walls extending from the lateral sides of the enclosure to the said bottom side and the said bin having a front side extending downwardly and rearwardly, and the said bin lying entirely within the enclosure, an outlet opening in one end of the semi-circular bottom side, a screw conveyor rotatably mounted within the semi-circular bottom of the bin, the said conveyor being arranged to intercept feed in the bin and convey it to the outlet opening, and operating means connected to the conveyor.

CHARLES E. IDDINGS.

References Cited in the file of this patent

UNITED STATES PATENTS

| Number | Name | Date |
|---|---|---|
| 970,224 | Hoelzer | Sept. 13, 1910 |
| 1,276,884 | Dierks | Aug. 27, 1918 |
| 1,305,832 | Patterson | June 3, 1919 |
| 1,845,072 | Beckman | Feb. 16, 1932 |
| 1,967,022 | Chandler | July 17, 1934 |
| 2,168,639 | Yeaman | Aug. 8, 1939 |